US007919723B2

(12) United States Patent
Ide et al.

(10) Patent No.: US 7,919,723 B2
(45) Date of Patent: Apr. 5, 2011

(54) APPARATUS AND METHOD FOR CUTTING LAWNS USING LASERS

(75) Inventors: Richard J. Ide, Middlesex, NY (US); Gary P. Hoffman, Middlesex, NY (US); Nanette F. Ide, Middlesex, NY (US)

(73) Assignee: Renewable Thermodynamics, LLC, Middlesex, NY (US)

( * ) Notice: Subject to any disclaimer, the term of this patent is extended or adjusted under 35 U.S.C. 154(b) by 1008 days.

(21) Appl. No.: 11/732,300

(22) Filed: Apr. 3, 2007

(65) Prior Publication Data
US 2008/0244970 A1 Oct. 9, 2008

(51) Int. Cl.
*B23K 26/38* (2006.01)
*A01D 34/01* (2006.01)
(52) U.S. Cl. .......................... 219/121.67; 56/1
(58) Field of Classification Search ............... 219/121.6, 219/121.85, 121.67, 121.72; 56/1; 264/400, 264/482; 47/58.1 LS
See application file for complete search history.

(56) References Cited

U.S. PATENT DOCUMENTS

| | | | |
|---|---|---|---|
| 3,063,645 A | 11/1962 | Tropeano et al. | |
| 3,652,844 A | 3/1972 | Scott, Jr. | |
| 4,378,755 A * | 4/1983 | Magnusson et al. | 118/684 |
| 4,438,765 A | 3/1984 | Wilinsky | |
| 4,605,290 A * | 8/1986 | Burns | 359/858 |
| 4,900,891 A * | 2/1990 | Vega et al. | 219/121.6 |
| 4,952,222 A | 8/1990 | Tobias | |
| 5,146,464 A | 9/1992 | Uemura | |
| 5,418,806 A | 5/1995 | Araki | |
| 5,550,853 A * | 8/1996 | Ostler | 372/34 |
| 5,748,657 A | 5/1998 | Gaddis | |
| 5,767,481 A | 6/1998 | Graf | |
| 5,915,949 A | 6/1999 | Johnson | |
| 6,127,653 A | 10/2000 | Samuels | |
| 6,269,617 B1 | 8/2001 | Blanchard | |
| 6,374,584 B1 | 4/2002 | Blanchard | |
| 6,388,231 B1 | 5/2002 | Andrews | |
| 6,420,674 B1 | 7/2002 | Cole, III et al. | |
| 6,758,630 B1 | 7/2004 | Vega | |
| 7,058,479 B2 | 6/2006 | Miller | |
| 2002/0003320 A1 * | 1/2002 | Temple et al. | 264/400 |
| 2005/0006655 A1 * | 1/2005 | Tanaka | 257/80 |
| 2005/0098545 A1 * | 5/2005 | de la Cal | 219/121.62 |
| 2006/0203620 A1 * | 9/2006 | Bedingfield | 368/247 |

FOREIGN PATENT DOCUMENTS

DE 4234342 A1 * 4/1994
WO WO-92/13443 A1 * 8/1992

* cited by examiner

*Primary Examiner* — Geoffrey S Evans
(74) *Attorney, Agent, or Firm* — Harris Beach PLLC; Neal L. Slifkin (57) ABSTRACT

The laser lawn cutting system of the present invention consists of an array or grid of laser heads distributed across a lawn. The laser heads may be permanently fixed above the surface of the lawn, or preferably mounted underneath the surface of the lawn and designed to pop up at the time of cutting. If mounted underneath the surface of the lawn, solenoids may be used to move the laser heads above the surface. Other mechanical devices could also be used to cause the laser heads to move above the surface of the lawn. Preferably, the laser heads will be distributed across the lawn in a grid or matrix, such that the laser light generated by the rotating laser head sweeps across the lawn in overlapping arcs to cut the vegetation. The system may also be used to melt snow or kill insects.

45 Claims, 14 Drawing Sheets

TOP VIEW

APPARATUS AND METHOD FOR CUTTING LAWNS USING LASERS

FIELD OF THE INVENTION

The present invention relates to an improved apparatus and method for cutting vegetation. More particularly, the present invention relates to an apparatus and method for cutting lawns using laser light.

BACKGROUND OF THE INVENTION

The vast majority of suburban houses and many urban houses in the United States have yards covered with grass. These grass yards or lawns must be mowed on a regular basis to keep the grass at a desirable height. Furthermore, commercial property, parks, golf courses and other maintained property is often covered with grass. Currently, most lawns and maintained properties are mowed using gasoline or electric powered lawn mowers, riding mowers or lawn tractors which include spinning steel blades. The owner, or someone hired by the owner, either pushes or rides the mowers across the lawn to cut the grass, which is a time consuming process. In addition, the use of gasoline powered lawnmowers uses a significant amount of fossil fuels and releases carbon dioxide and pollutants into the atmosphere.

Recently, lawn mowing devices have been developed which use lasers to cut grass. For example, U.S. Pat. No. 6,269,617 discloses a lawn cutting device in which a lawn tractor or lawn mower is fitted with an apparatus which uses lasers to cut the grass. While this design eliminates the rotating steel blade, it still requires the operator to push or ride the mower across the lawn which is a time consuming process.

U.S. Pat. Nos. 4,952,222 and 6,374,584 also disclose laser devices for cutting grass which include a mower which must be moved across the lawn by a person. In each of these prior art references, significant time and effort must be expended to cut the lawn.

A device is needed which will allow a land owner to automatically and effortlessly cut the grass on a lawn using lasers without having to utilize a lawn mower, riding mower or lawn tractor.

A device is also needed which will allow a land owner to cut the grass in a manner which causes less pollution and uses less energy.

SUMMARY OF THE INVENTION

The present invention overcomes the problems associated with prior devices used for cutting lawns. It is no longer necessary to push or ride a lawn mower across the lawn. The present invention utilizes rotating laser light from fixed locations on the lawn to cut the grass.

The laser lawn cutting system of the present invention will consist of an array or grid of laser heads distributed across a lawn. The laser heads may be permanently fixed above the surface of the lawn, or preferably mounted underneath the surface of the lawn and designed to rise up at the time of cutting. If mounted underneath the surface of the lawn, solenoids may be used to move the laser heads above the surface. Other mechanical devices, as would be within the skill of one of ordinary skill in the art to design, could also be used to cause the laser heads to move above the surface of the lawn.

A control box can be programmed to make the laser heads rise up and cut the lawn on a predetermined schedule. In addition or in the alternative, the system could be designed to be switched on and off manually. The laser heads can also be arranged in zones so that each zone is independently controlled by a control box. Both the programming and the arrangement of the laser heads in to zones which are independently controlled can be easily accomplished by one of ordinary skill in the art. Similar control systems are used in the lawn sprinkler art.

Preferably, the laser heads will be distributed across the lawn in a grid or matrix, such that the laser light generated by the rotating laser head sweeps across the lawn in overlapping arcs. Each laser head may rotate up to 360 degrees, or the amount of its rotation may be limited so that the laser light does not extend to objects, such as flowerbeds, trees or other vegetation, in an undesirable manner. In addition, the rotation of the heads can be adjusted so that the laser light does not extend beyond the boundaries of the property on which they are installed.

The laser light need only have enough power such that it cuts through a single or a small number of blades of grass. As the light continues to sweep, multiple sweeps of the same area will gradually cut more blades of grass further from the laser head until the desired range is obtained. In this way, the power of the laser can be held to the lowest possible level consistent with cutting a single blade of grass or a small number of blades at one time. The variability of the surface of the ground requires variable length beams, which are achieved by varying the power level of the lasers. Where the ground surface is uneven, lower power is used to prevent the laser light from scalping the lawn or cutting the grass too high. By localizing the laser light emitted from the laser heads, a more even cut length is possible. Instead of using lower power, a lens system could be used which allows for the adjustment of the length of the laser beam, or its effective range. Alternatively, the laser heads could be replaceable such that a laser head which generates a laser beam of an appropriate length may be selected for the localized requirements on the land area.

It is preferable that the lasers used are solid state, low power, low voltage and direct current, although other types of lasers and power sources are possible. If low voltage direct current is used, the commonly used 12 volt direct current can adequately power the laser heads. The beam created by the laser heads is preferably divergent, so that the intensity of the beam will drop rapidly with distance. The range of the cutting ability of the laser light could be, preferably, up to 12 to 20 feet in diameter, although any distance of cutting range could be used. Semiconductor laser diodes may be used which generate laser beams in the visible or infrared light spectrum.

Preferably, the laser heads will be mounted on a heat sink, which will absorb the heat generated by the laser. The heat can then slowly dissipate into the ground in the long interval before the next use.

To facilitate the safe operation of the system, motion sensors could be used to prevent or stop the generation of the laser beam when the motion sensor senses a predetermined amount of motion within or near the laser grid. With this feature, when an animal or person enters the lawn area covered by the matrix of laser heads, the system will prevent the generation of laser light. The motion detectors should, preferably, cover an area which extends beyond the property lines of the land which has the system installed. This would provide an early warning system that will safely result in laser shutdown before people or animals actually cross the property lines. In addition, rain sensors could be used to prevent the generation of a laser beam when it is raining.

The present invention may also be used to control insects. The laser light generated by the laser heads will be powerful enough to kill small flying insects such as mosquitoes and gnats. These insects frequently are found in the evening and at night flying just above a lawn or above a stationary body of water, such as a small pond. A laser head may be adapted such that it can kill these insects. The laser beam could be elevated a few inches above those used for cutting the lawn. Preferably, the beam of light would be wider and more diffuse than one designed to cut grass. The laser heads used for insect elimination could be combined with the ones for cutting grass or could be part of an independent plurality of laser heads. For example, when used over water, the insect elimination lasers will be used without the vegetation cutting lasers. In addition, the insect killing laser beams could be emitted much higher above the ground than the vegetation cutting lasers so that the laser light can sweep large areas above the land, well above the level of the top of the vegetation.

In another embodiment, the laser heads can be used to melt snow and ice on a surface, such as a driveway, walkway, patio, parking lot or other surface. The laser heads are arranged along the perimeter of a surface, with overlapping coverage. The laser heads can melt the snow as it falls, or after it accumulates on the surface. The resulting water would either drain away or be evaporated. To melt snow and ice, a power level lower than that used to cut grass would be possible. As with the grass cutting application, multiple passes would be used to melt the snow To melt the snow and ice, the laser heads would be aimed such that a portion of the beam is directed downward, to sweep the surface itself which would keep the water from re-freezing.

DETAILED DESCRIPTION OF THE EMBODIMENTS

Figure 1:
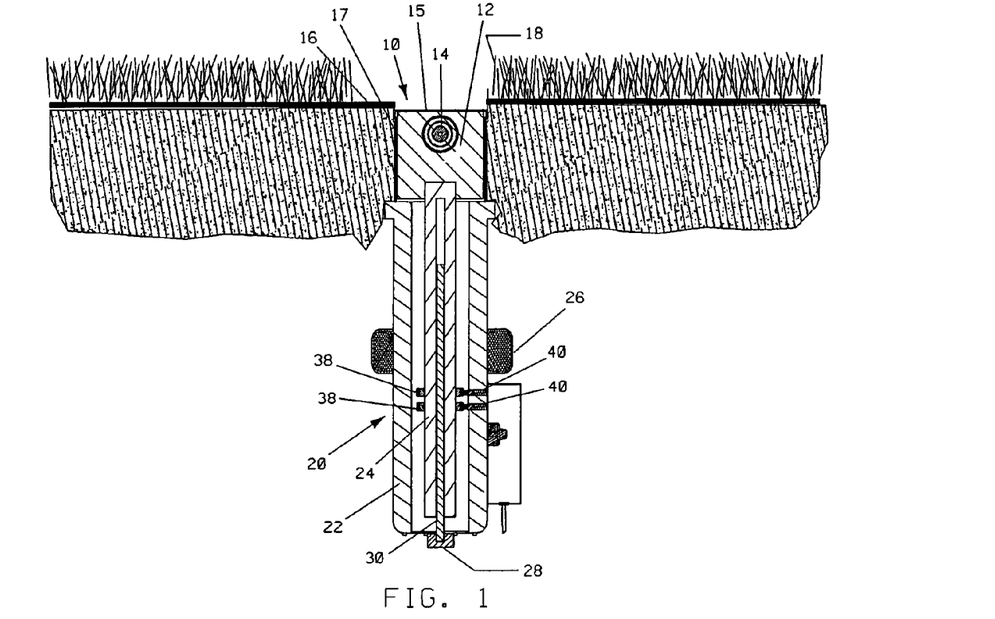
FIG. 1 is a cross-sectional elevation view of the laser lawn cutting apparatus of the present invention.

FIGS. 1-18 illustrate the present invention. In FIG. 1, a cross-sectional view of a single laser assembly 10 is shown. The assembly 10 includes a pop-up laser head 12 with a semiconductor diode laser 14. When not in use, the pop-up laser head 12 is flush with the ground 16 (or below grade) at the base of the grass 18. A cap 15 and cylinder 17 protect the laser head 12 when it is below ground 16. Beneath the ground level 16 is the laser head mounting assembly 20 which includes a shell 22, pin 24 and solenoid coil 26. The pin 24 is mounted for translational movement in the vertical direction. The pin 24 is also mounted for rotational movement caused by motor 28 turning shaft 30. Brushes 40 and rings 38 provide electrical energy from a power supply 34 to power the semiconductor laser 14. Wires (not shown) provide electrical power to the solenoid 26 and the motor 28.

Figure 2:
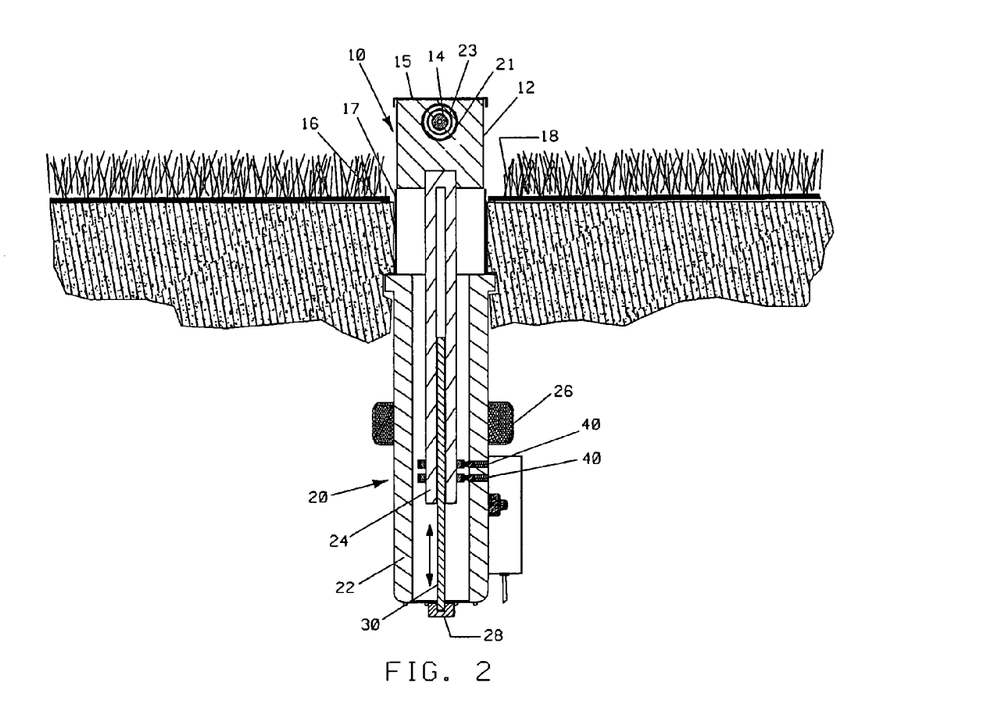
FIG. 2. is a cross-sectional elevation view of the laser lawn cutting apparatus of FIG. 1 with the laser head shown in a second position.
Figure 3:
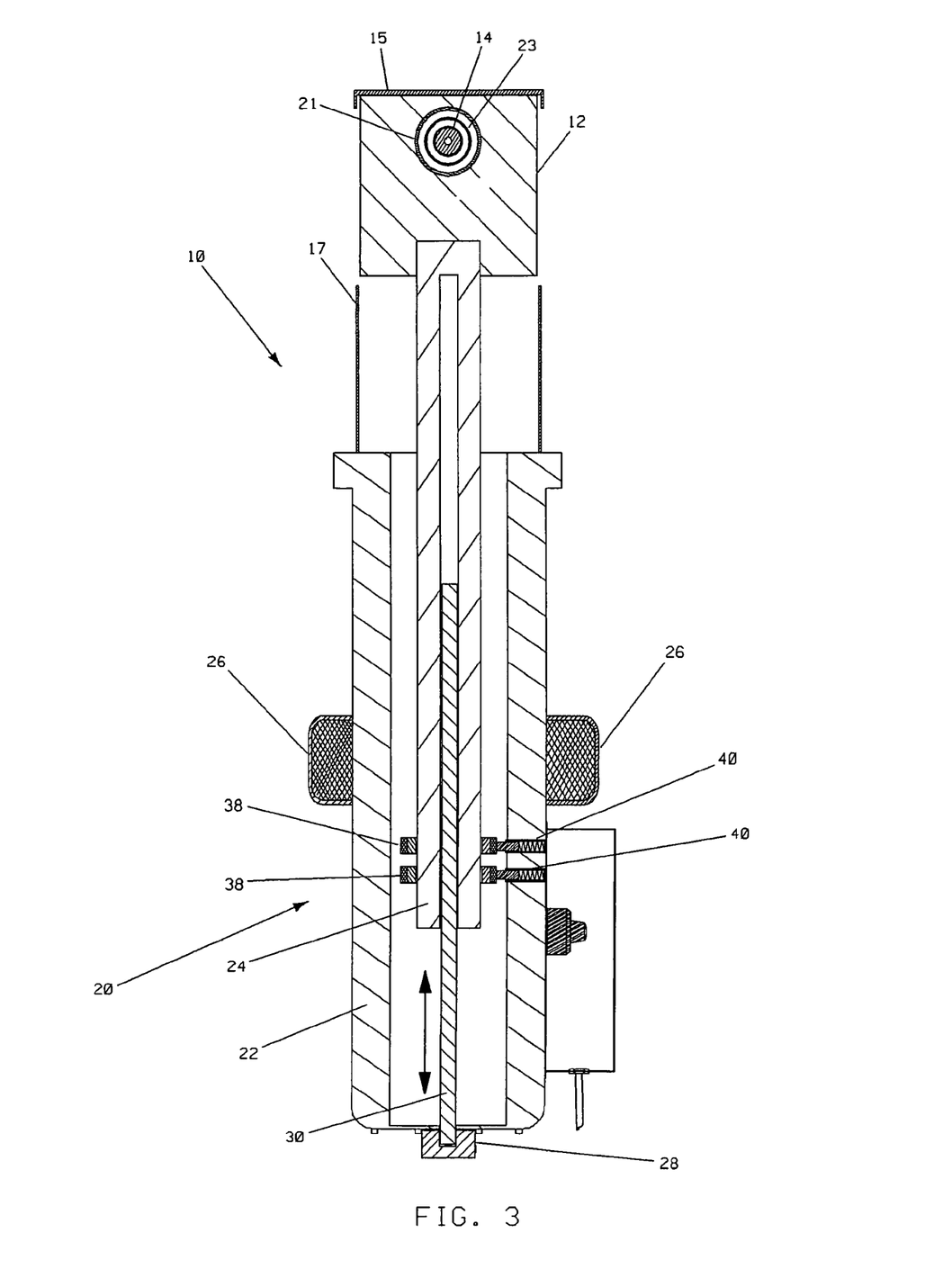
FIG. 3 is a cross-sectional elevation view of the laser lawn cutting apparatus of FIG. 1.

When electrical current is sent from the power supply 34 to the solenoid 26, it is energized and the pin 24 moves upward. The laser 14 is energized and is caused to rotate by the motor 28 through shaft 30. FIGS. 2 and 3 show the laser head 12 in its extended position above the ground 16. The laser head 12 can be adjusted to project a predetermined height above the ground 16, thus determining the height of the cut grass 18. A lens system, including a focus ring 21 and a lens 23, may be used to vary the length of the laser beam emitted from the laser head 12. Alternatively, the length of the laser beam may be varied by varying the voltage of the electrical energy delivered to the laser head 12.

Figure 4:
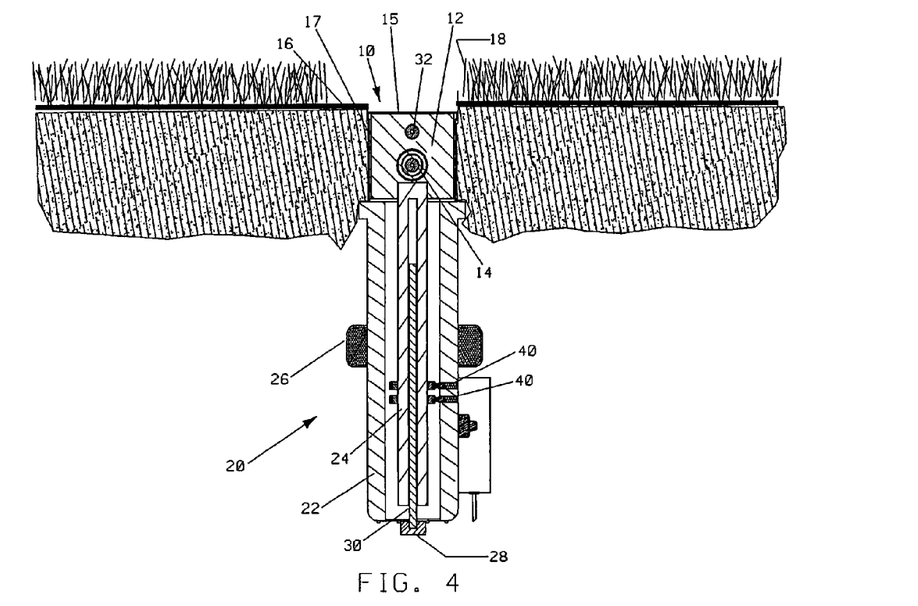
FIG. 4 is a cross-sectional elevation view of a second embodiment of the laser lawn cutting apparatus of the present invention.
Figure 5:
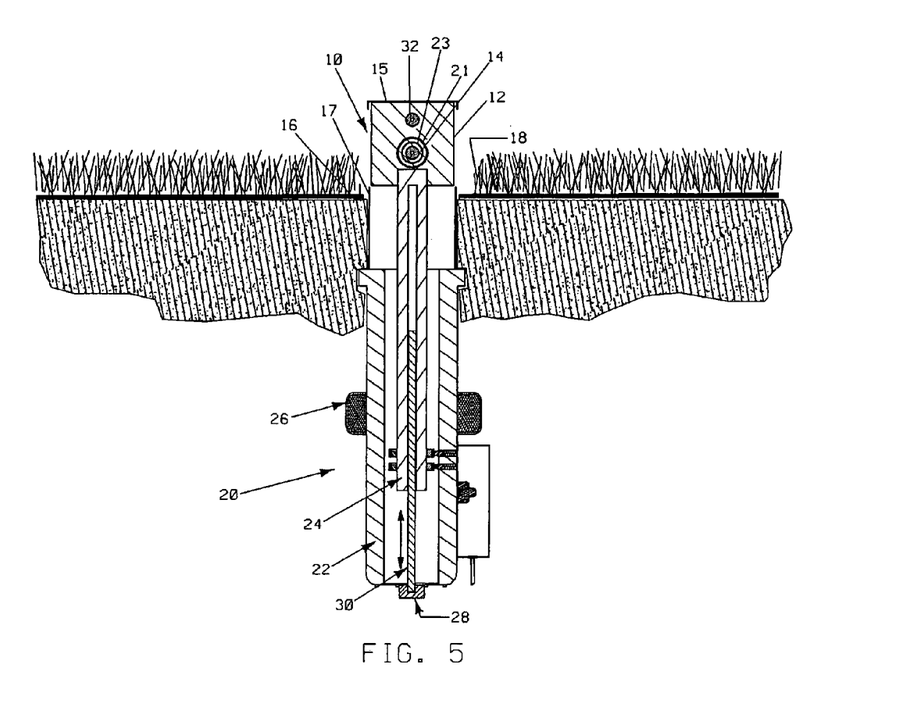
FIG. 5 is a cross-sectional elevation view of the laser lawn cutting apparatus of FIG. 4 with the laser head shown in a second position.

FIGS. 4 and 5 show an alternative embodiment of the laser head assembly. In FIGS. 4 and 5, a second laser diode 32 has been added for insect control. This laser diode 32 projects a laser light at a level higher than the laser diode 14. The laser light from laser diode 32 is adapted to aim a divergent beam to kill insects flying slightly above the level of the top of the grass 18.

Figure 6:
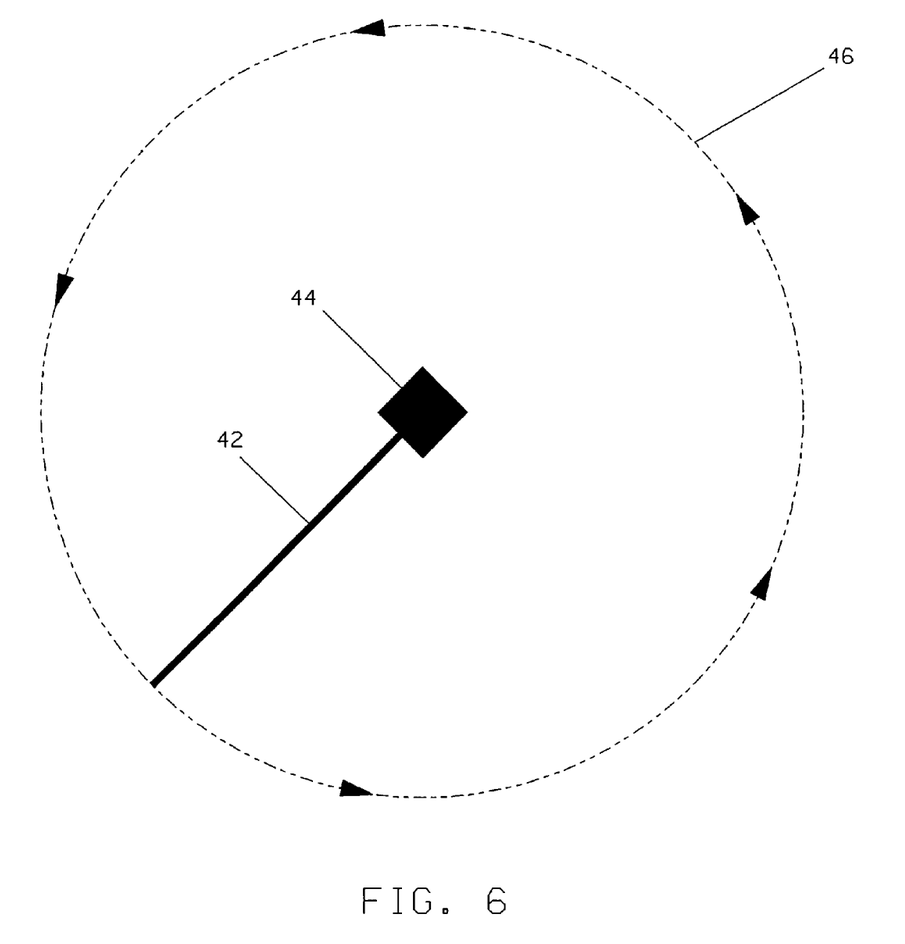
FIG. 6 is an illustration of a laser head cutting path of the present invention.

FIG. 6 illustrates the path of laser beam 42 emitted from laser head 44. The beam sweeps through a circular path 46.

Figure 7:
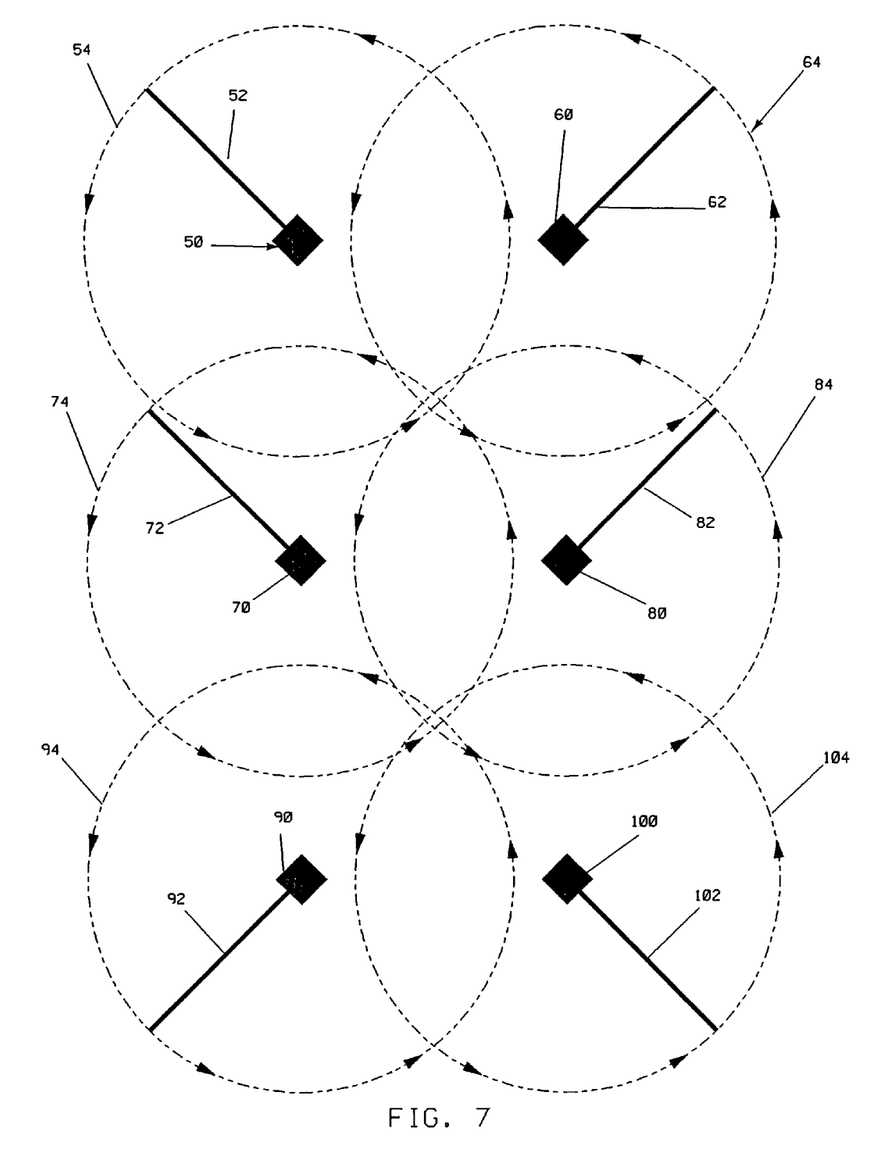
FIG. 7 is an illustration of an array of laser heads of the present invention.

FIG. 7 shows several laser heads 50, 60, 70, 80, 90 and 100 in a grid. Each laser head emits a laser beam, 52, 62, 72, 82, 92 and 102, respectively. Each laser beam has associated with it a circular arc of coverage 54, 64, 74, 84, 94 and 104. The circular arcs overlap one another as shown in FIG. 7 such that the entire area of the grid is covered by the overlapping circles created by the laser beams.

Figure 8:
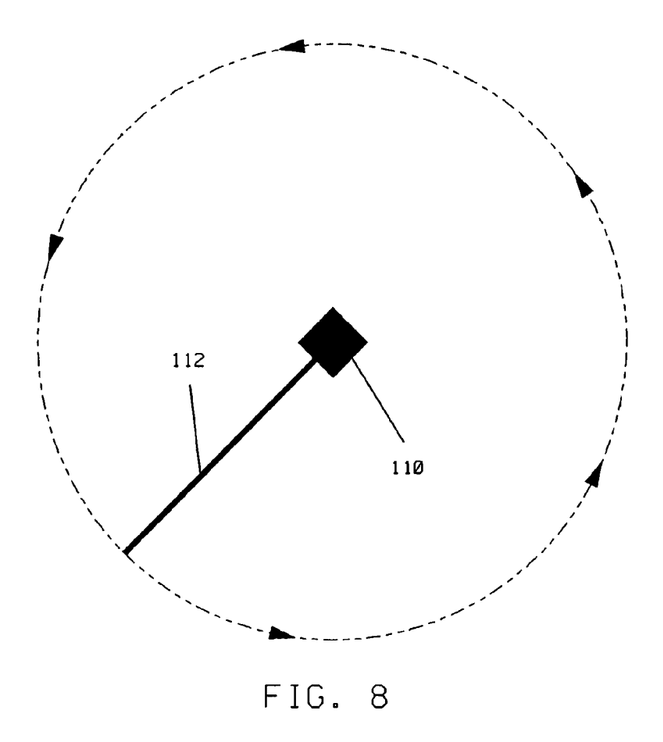
FIG. 8 is an illustration of a laser head cutting path of the present invention.
Figure 9:
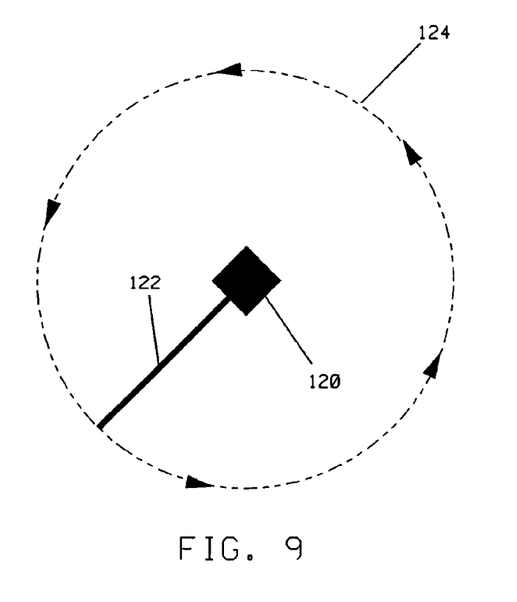
FIG. 9 is an illustration of a laser head cutting path of the present invention.
Figure 10:
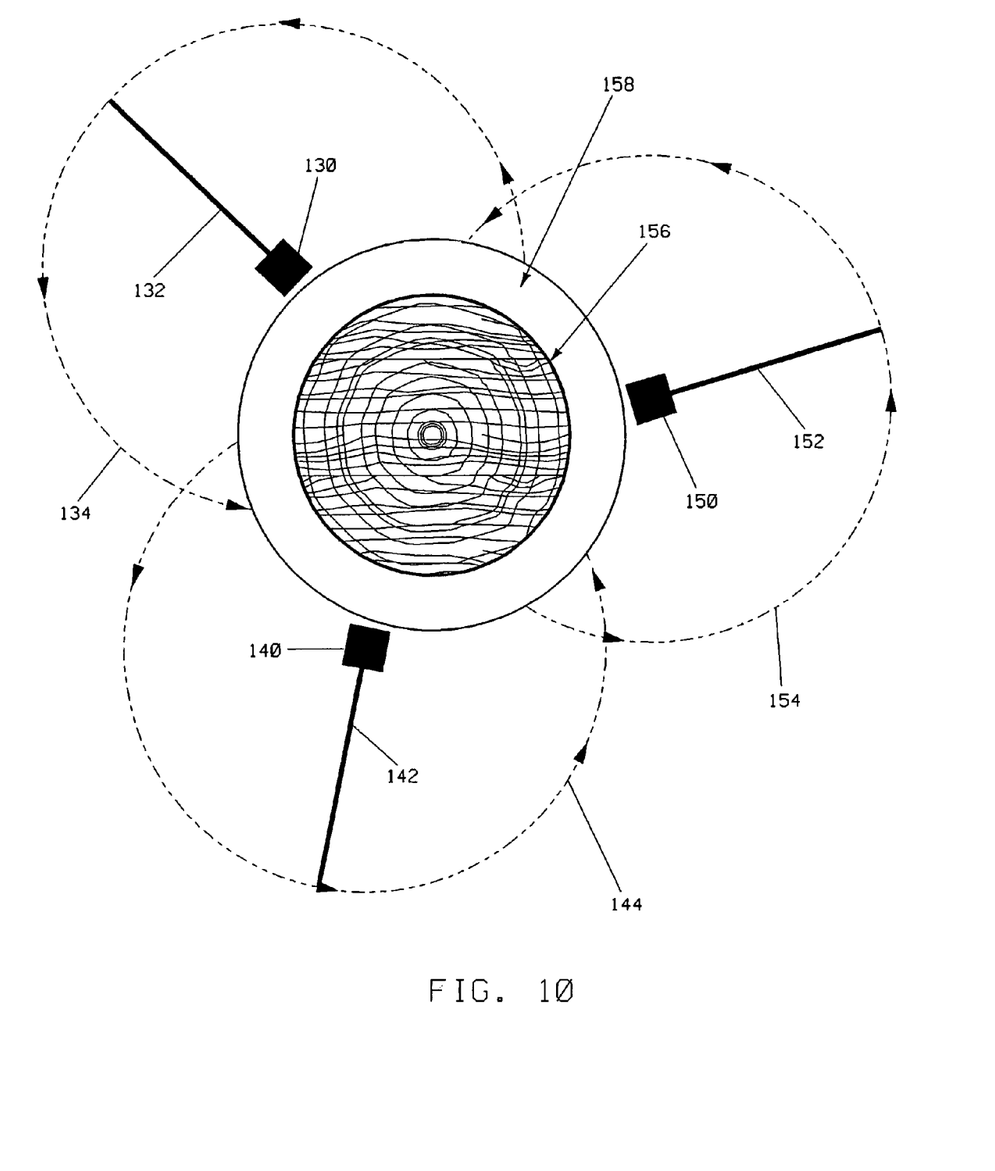
FIG. 10 is an illustration of an array of laser heads of the present invention.

FIGS. 8 and 9 illustrate laser heads having laser output of varying power. In FIG. 8, laser head 110 emits laser beam 112 to create a relatively small cutting area 114. In contrast, in FIG. 9, laser head 120 creates a larger laser beam 122 with a larger cutting area 124. FIG. 10 illustrates the installation of laser heads 130, 140 and 150 arrayed around a tree 156. Laser head 130 emits a laser beam 132 creating semicircular arc 134. Similarly, laser head 140 emits laser beam 142 in a semicircular arc 144 and laser head 150 emits laser beam 152 in semicircular arc 154. Surrounding tree 156 is a mulch bed 158. Mechanical and/or electrical stops (not shown) could be used to ensure that the rotation of the laser beams 132, 142 and 152 ends when the beams reach the mulch bed 158. If stops are used, the movement of the laser head would reverse once the stops prevent further movement of the laser heads in one direction. Alternatively, the laser heads 130, 140 and 150 can continue to rotate through 360 degrees but power to the laser heads may be interrupted for the portion of the rotation which would otherwise cause the laser beam to impinge upon the mulch bed 158 and tree 156. In yet another alternative (not shown), the slip ring could have conductive material on the portion of the rotation for laser light is to be generated and the remainder of the slip ring would have insulating material such that no electricity is delivered to the laser heads. With this design, the motor would cause rotation of the laser heads and the laser heads would be energized only when the brushes contact the conductive material. No stops or reversing mechanism would be needed.

Figure 11:
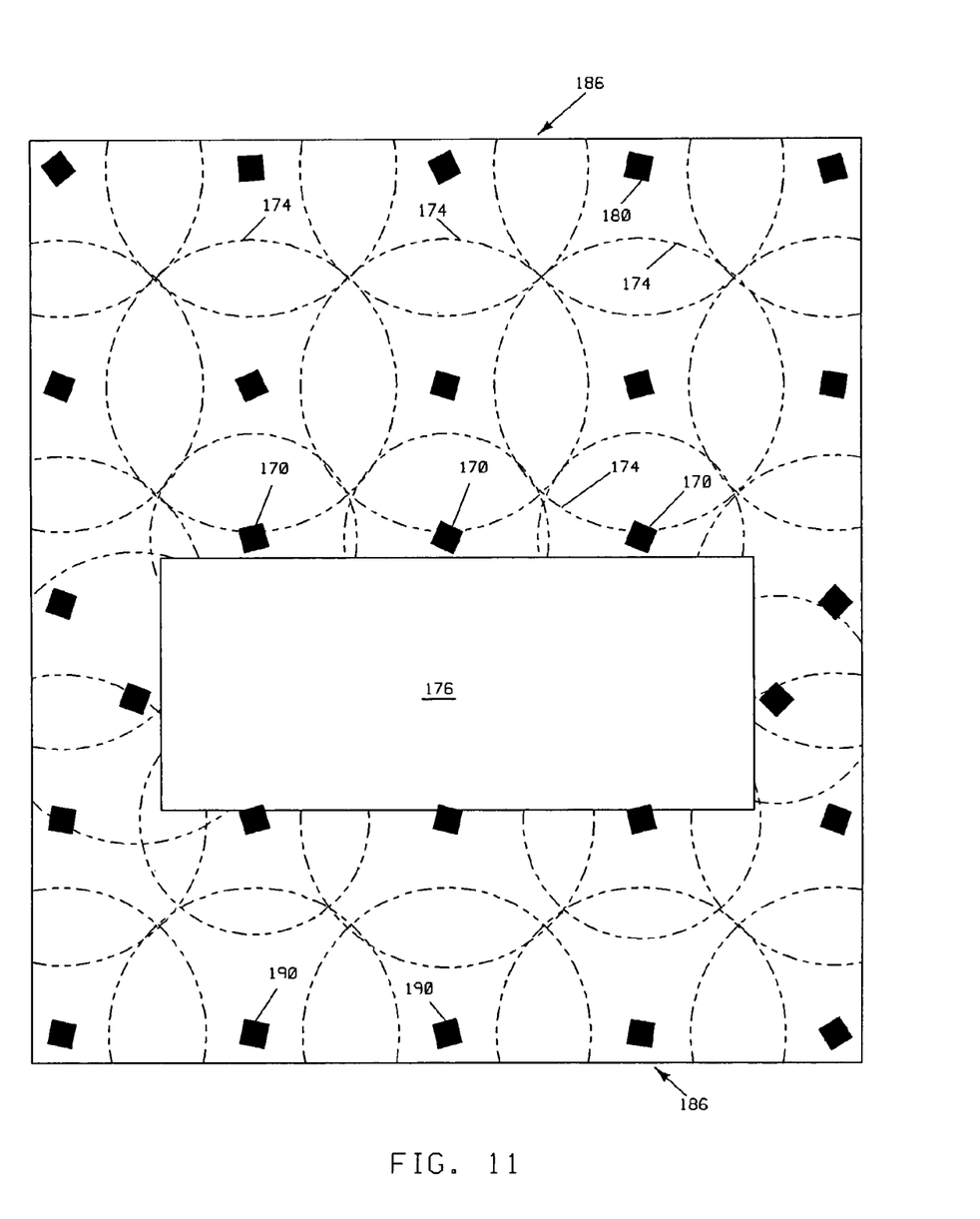
FIG. 11 is an illustration of an array of laser heads of the present invention.

FIG. 11 illustrates a matrix of laser heads arrayed in a typical yard. Laser heads 170 are adjacent a building 176 and, therefore, the arcs 174 end at the perimeter of the building 176. Laser heads 180 are adjacent the property boundary 186 and therefore arcs 184 end at the property boundary 186. Laser heads 190 are between the building 176 and the property boundary 186 and, therefore, are permitted to extend around a full 360 degrees.

Figure 12:
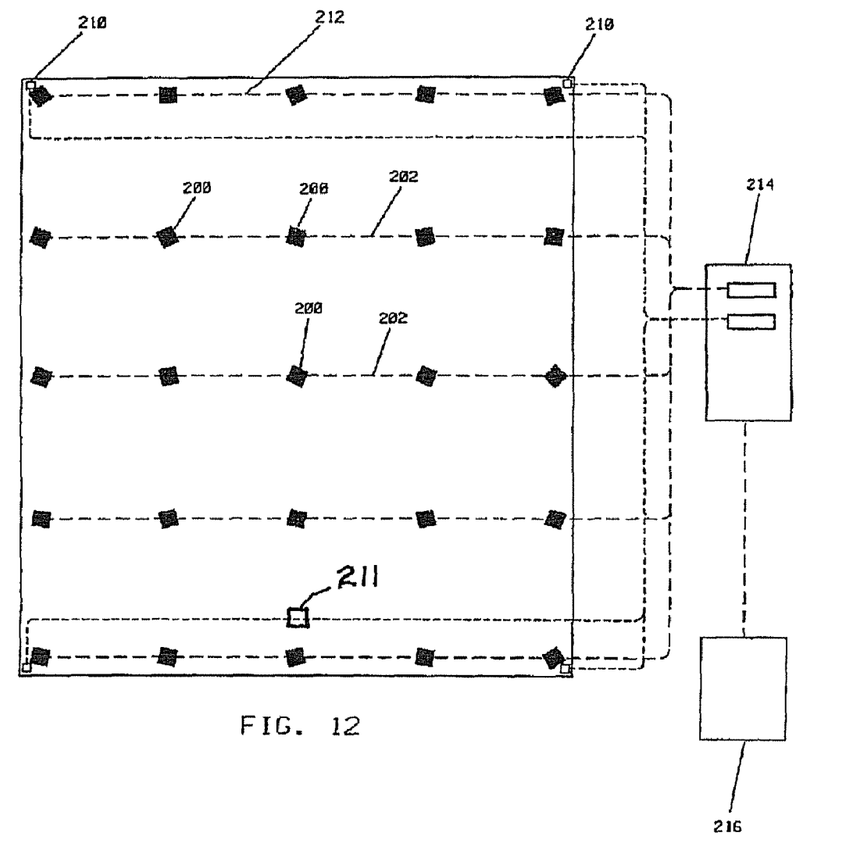
FIG. 12 is an illustration of a wiring diagram of an array of laser heads of the present invention.

FIG. 12 shows a simplified wiring diagram for the system. The laser heads 200 are connected through wires 202 to a control box 214, designed to control the operations of the system. Motion sensors 210 are connected through wires 212 to the control box 214. A power supply 216 is provided to power the system.

Figure 13:
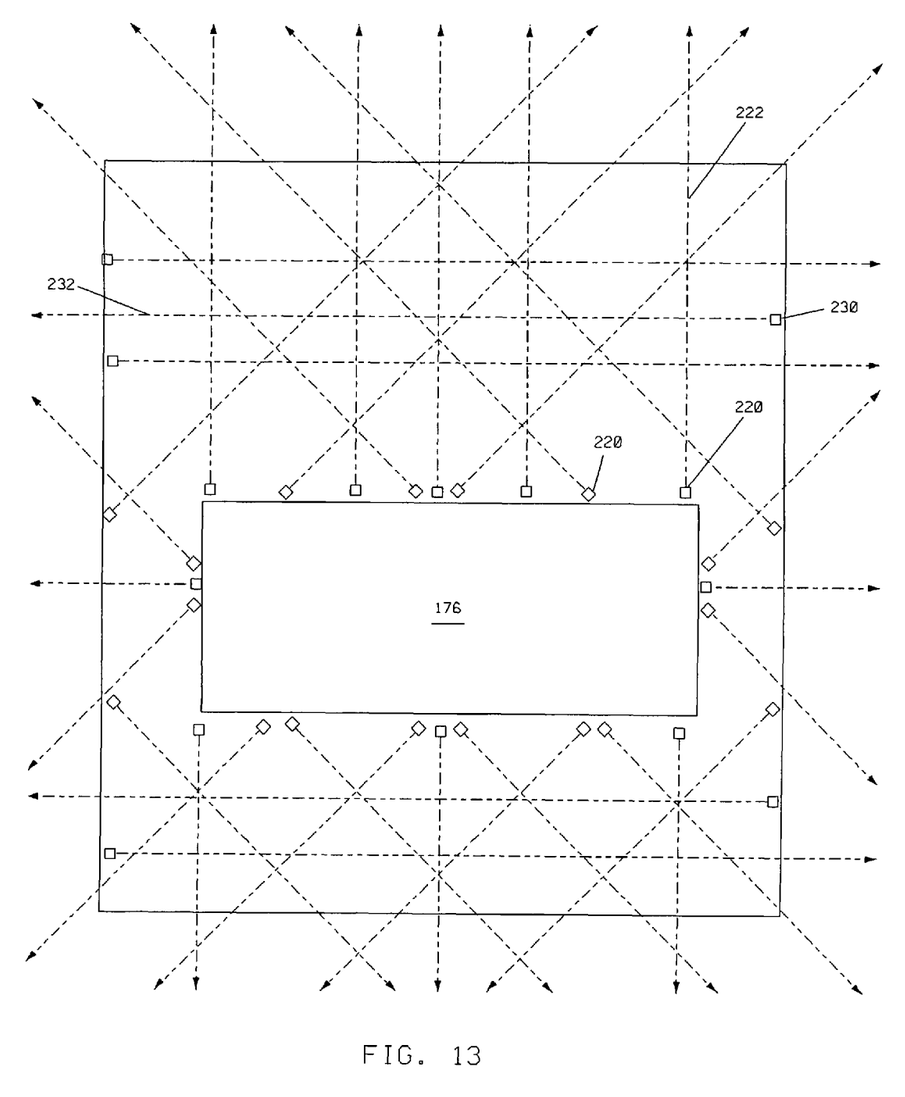
FIG. 13 is an illustration of a sensor array of the present invention.

FIG. 13 shows a sensor array for detecting motion on the lawn. Sensors 220 are placed adjacent the building 176. Sensors 220 cover an area of the lawn 224 indicated by lines 222. Sensors 230 are placed adjacent the property line 186 and cover an area of the lawn 224 indicated by lines 232. If movement is detected by sensors 220 or 230, the control box 214 will shut off power to the laser heads.

Figure 14:
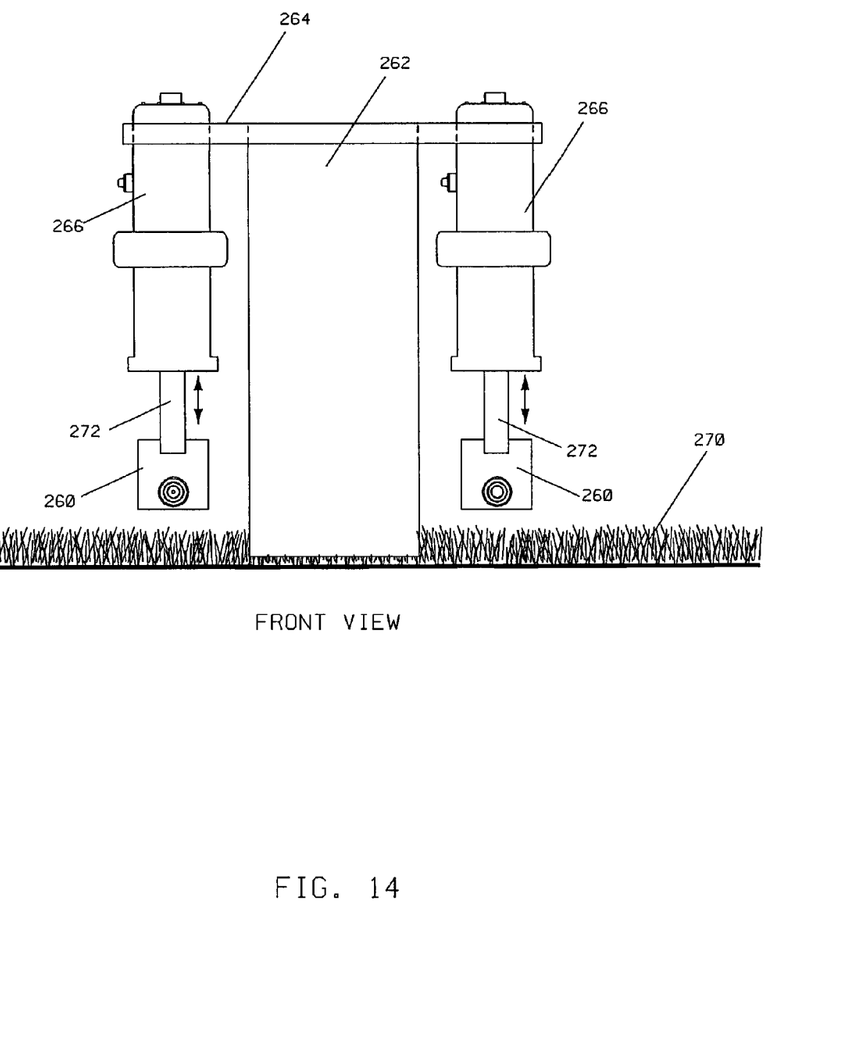
FIG. 14 is a front elevation view of another embodiment of the present invention.
Figure 15:
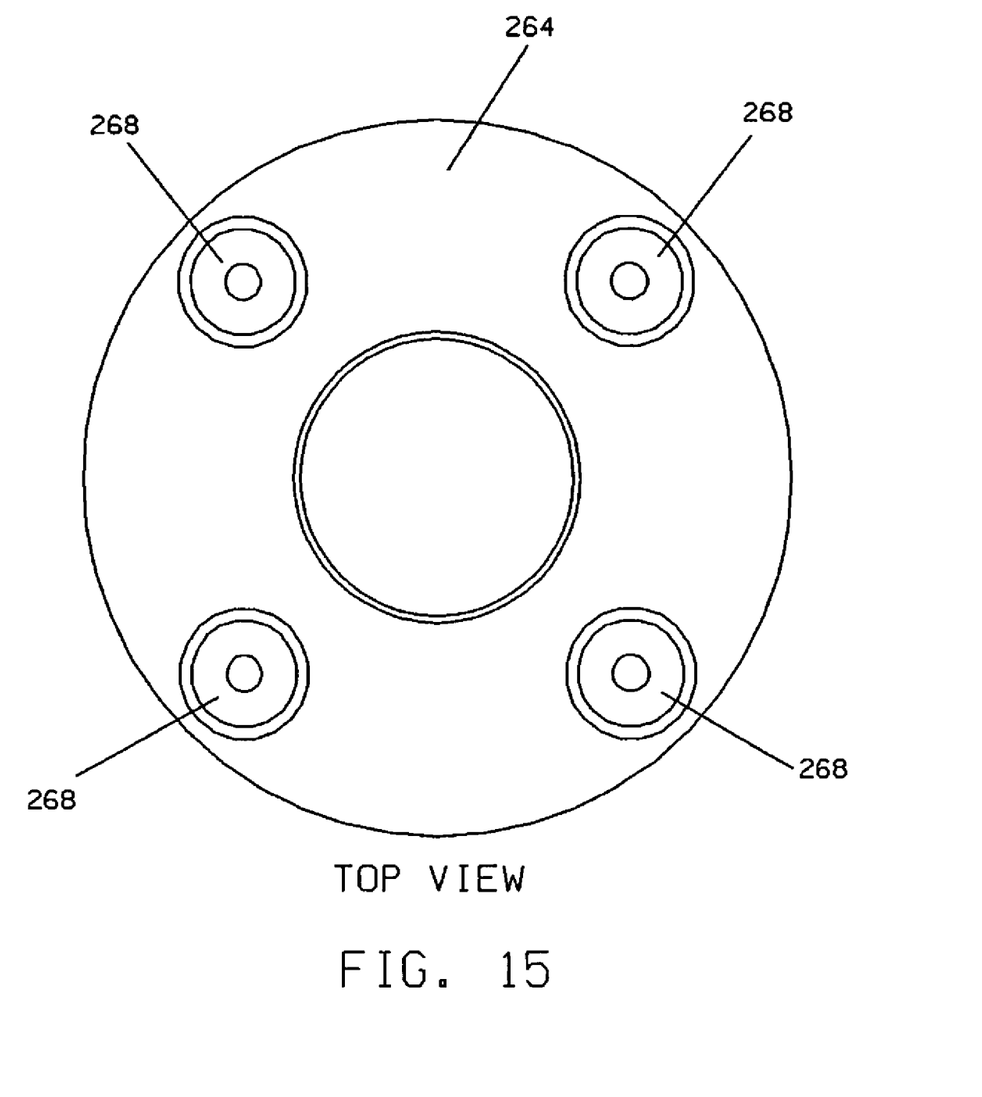
FIG. 15 is a top plan view of the present invention illustrated in FIG. 14.
Figure 16:
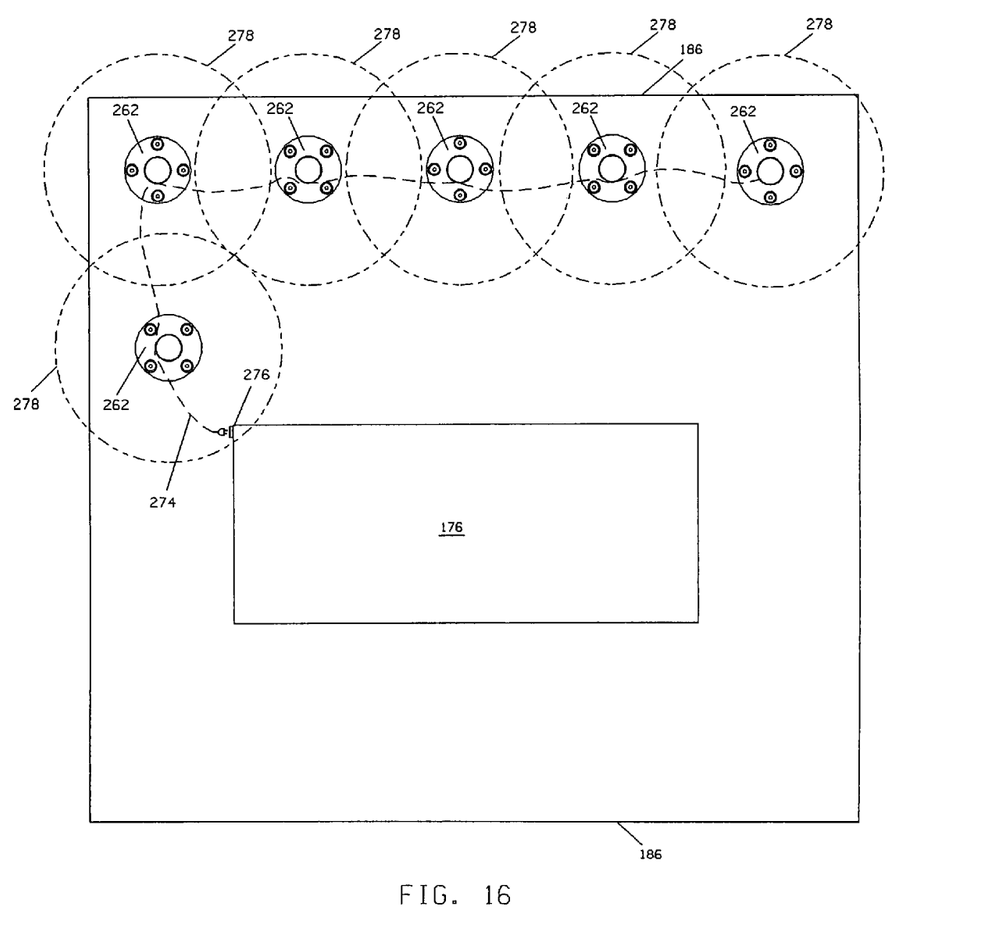
FIG. 16 is an illustration of another embodiment of an array of laser heads of the present invention.

FIGS. 14 through 16 illustrate another embodiment of the invention, showing a portable laser lawn cutting system. The laser heads 260 are mounted on a movable base 262. The base 262 may have a plurality of laser heads 260, such as, for example 2 to 4 laser heads 260. A mounting plate 264 and housing 266 hold the laser heads 260 above the ground 270. The height of each laser head 260 is adjustable by telescoping post 272.

As shown in FIG. 15, each plate 264 holds four laser heads 260 through mounting assembly 268. Laser heads 260 work together to sweep 360 degrees. When energized, the laser heads 260 extend down to a preset level for use.

FIG. 16 shows a series of six movable bases 262 connected by a flexible cord 274. The cord 274 is designed to be connected to a standard household electrical source 276 and will include a transformer (not shown) to reduce the voltage to low voltage direct current. Each movable base 262 has a cutting path 278 within which the vegetation will be cut.

Figure 17:
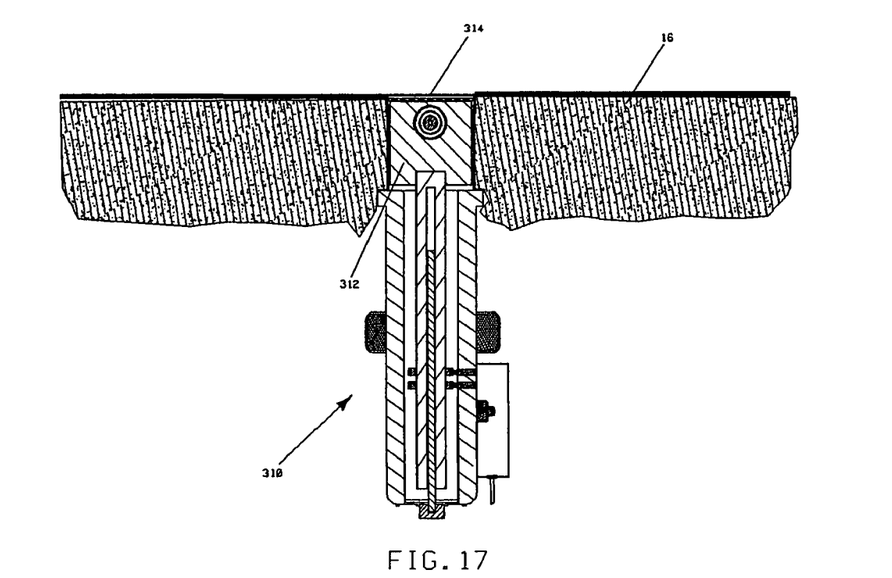
FIG. 17 is a front elevation view of another embodiment of the present invention showing the laser head in the retracted position.
Figure 18:
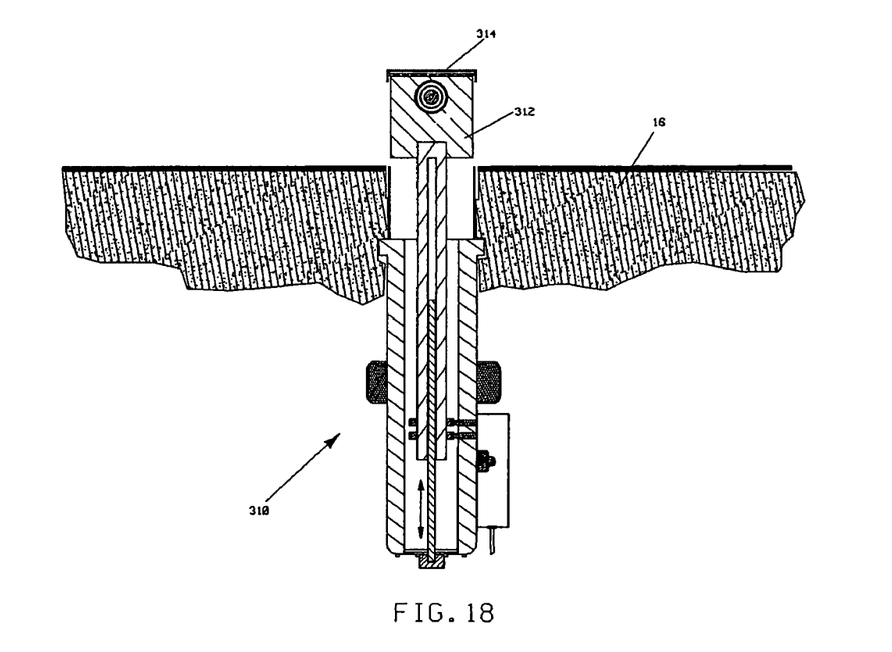
FIG. 18 is a front elevation view of the present invention of FIG. 17 showing the laser head in the extended position.

FIGS. 17 and 18 illustrate a laser assembly 310 for use in melting snow and ice. FIG. 17 illustrates the laser assembly 310 in the retracted position and FIG. 18 illustrates the laser assembly 310 in an extended position. The laser assembly 310 is similar to and operates in the same manner as the laser assembly shown in FIGS. 1 and 2. However, the assembly 310 includes a heating element 314 to melt snow and ice which would otherwise prevent the laser head 312 from emerging from the ground 16.

What is claimed is:

1. A method of cutting vegetation on a land area, comprising the steps of:
    a) providing a plurality of laser heads at fixed locations on said land area;
    b) raising said plurality of laser heads by direct electromechanical actuation from a first position below the surface of said land area to a second position above said surface;
    c) generating a plurality of laser beams from said laser heads; and
    d) rotating said laser beams about said fixed locations to cut through a portion of said vegetation.

2. The method of claim 1 further including the step of generating said laser beams on a predetermined schedule.

3. The method of claim 1 wherein said plurality of laser heads comprises a first group of laser heads and a second group of laser heads and wherein said first and second groups may be actuated independently of each other.

4. A method of melting snow on a portion of a land area, comprising the steps of:
    a) providing a plurality of laser heads at a plurality of fixed locations on said land area;
    b) raising said plurality of laser heads by direct electromechanical actuation from a first position below the surface of said land area to a second position above said surface;
    c) generating a plurality of laser beams from said laser heads; and
    d) rotating said laser beams about said fixed locations to melt the snow.

5. A method of cutting vegetation on a land area, comprising the steps of:
    a) providing a plurality of laser heads mounted in an array on a portable base disposed at a first location on said land area;
    b) generating a plurality of laser beams from said plurality of laser heads, said plurality of laser beams having overlapping fields of effectiveness;
    c) rotating said laser beams to cut through a first portion of said vegetation whilst said portable base is immobile at said first location;
    d) stopping said generating and rotating of said laser beams;
    e) moving said plurality of laser heads and portable base to a second location on said land area; and
    f) repeating steps e), b), c) and d) a plurality of times to cut through a total desired area of vegetation on said land area.

6. An apparatus for cutting vegetation on a land area, comprising:
    a plurality of laser heads mounted in said land area and adapted to generate a plurality of laser beams, said laser heads being adapted to move the angular positions of said laser beams such that said laser beams cut through said vegetation, wherein said laser heads are adapted to move by direct electromechanical actuation between a first position wherein said laser heads are below the surface of said land area and a second position wherein said laser heads are above said surface.

7. The apparatus of claim 6 wherein said direct electromechanical actuation includes a solenoid.

8. The apparatus of claim 6 further including a heat sink attached to each laser head for dissipating heat generated by said laser heads.

9. The apparatus of claim 8 wherein each of said laser heads is adjustable in power output to limit cutting of vegetation to a distance of up to 20 feet.

10. The apparatus of claim 6 further including a motion sensor for preventing the generation of a laser beam when said motion sensor senses a predetermined amount of motion within the bounds of said land area.

11. The apparatus of claim 6 further including a rain sensor for preventing the generation of a laser beam when said rain sensor senses rain within the bounds of said land area.

12. The apparatus of claim 6 wherein at least one of said laser beams is divergent.

13. The apparatus of claim 6 wherein said laser heads are powered by direct current.

14. The apparatus of claim 13 wherein the voltage of said direct current is below 15 volts.

15. The apparatus of claim 6 wherein said laser heads are semiconductor lasers.

16. The apparatus of claim 6 wherein said laser heads generate laser light in the infrared spectrum.

17. The apparatus of claim 6 wherein said laser heads generate laser light in the visible spectrum.

18. The apparatus of claim 6 wherein said laser heads emit a laser beam only while in said second position.

19. The apparatus of claim 6 wherein each of said laser heads is adapted for rotation about an axis.

20. The apparatus of claim 19 wherein the amount of angular rotation of said laser heads may be preselected by a user.

21. The apparatus of claim 6 wherein the electrical energy delivered to energize some of said laser heads of may be varied such that the power of said laser beams may be varied.

22. The apparatus of claim 6 further including means to vary the power of said laser beams.

23. The apparatus of claim 22 wherein said means includes varying the voltage applied to said laser heads.

24. The apparatus of claim 22 further including a lens system operatively connected to each of said laser heads.

25. The apparatus of claim 6 wherein at least some of said laser heads may be removed and replaced by laser heads having a different power.

26. The apparatus of claim 6 wherein at least some of said plurality of laser heads are adapted to generate a second laser beam at a higher level above said land area.

27. An apparatus for melting snow on a portion of a land area, comprising:
a plurality of laser heads mounted at a plurality of fixed locations in the land area and adapted to generate a plurality of laser beams, said laser heads being adapted to move the angular position of said laser beams such that said laser beams melt the snow,
wherein said laser heads are adapted to move between two positions, a first position wherein said laser heads are below the surface of said land area and a second position wherein said laser heads are above said surface.

28. The apparatus of claim 27 further including means to vary the power of the laser beam generated by some of said laser heads.

29. The apparatus of claim 28 wherein said means to vary the power includes varying the voltage.

30. The apparatus of claim 28 further including a lens system operatively connected to at least one of said laser heads.

31. The apparatus of claim 27 wherein each of said laser heads is adapted for rotation about an axis.

32. The apparatus of claim 31 wherein the amount of angular rotation of said laser heads is preselectable by a user.

33. The apparatus of claim 27 further including an electromechanical actuator for moving said laser heads between said first and second positions.

34. The apparatus of claim 27 further including a heat sink attached to each of said laser heads.

35. The apparatus of claim 27 wherein the power of each of said laser heads is controlled such that said laser head melts said snow over a distance of up to 20 feet.

36. The apparatus of claim 27 further including a motion sensor for preventing the generation of a laser beam when said motion sensor senses a predetermined amount of motion within said portion of said land area.

37. The apparatus of claim 27 wherein at least one of said laser beams is divergent.

38. The apparatus of claim 27 wherein said laser heads are powered by direct current.

39. The apparatus of claim 38 wherein the voltage of said direct current is less than about 15 volts.

40. The apparatus of claim 27 wherein said laser heads are semiconductor lasers.

41. The apparatus of claim 27 wherein said laser heads generate laser light in the infrared spectrum.

42. The apparatus of claim 27 wherein said laser heads generate laser light in the visible spectrum.

43. The apparatus of claim 27 wherein said laser heads are enabled to emit laser beams only in said second position.

44. The apparatus of claim 27 wherein electrical energy delivered to energize some of said laser heads may be varied such that the power of the laser beams generated by said laser heads may be varied.

45. The apparatus of claim 27 wherein some of said laser heads may be removed and replaced by laser heads having a different power of the laser beam generated thereby.

* * * * *